Dec. 9, 1952        F. W. MEREDITH        2,621,003

AUTOMATIC CONTROL APPARATUS FOR AIRCRAFT

Filed April 26, 1948        2 SHEETS—SHEET 2

INVENTOR
FREDERICK WILLIAM MEREDITH
BY Moore & Hall
ATTORNEYS

Patented Dec. 9, 1952

2,621,003

UNITED STATES PATENT OFFICE 2,621,003

AUTOMATIC CONTROL APPARATUS FOR AIRCRAFT

Frederick William Meredith, London, England, assignor to S. Smith & Sons (England) Limited, London, England, a British company Application April 26, 1948, Serial No. 23,260 In Great Britain April 28, 1947

17 Claims. (Cl. 244—77)

This invention relates to automatic control systems for aircraft where provision is made for effecting banked turns. In such system means are provided for presetting the angle of bank of the aircraft and for presetting the rate of turn of the aircraft the two settings being suitably related to ensure a correctly banked turn at a predetermined air speed. The angle of bank however can only be pre-set from a datum which is usually determined during level flight by a gravity responsive monitoring device, such for example as the gravity responsive erecting devices of a gyro-vertical. During a turn such gravity responsive monitoring devices indicate the apparent vertical and not the true vertical and consequently cause a displacement of the datum during curved flight. For this reason they are sometimes cut out of operation during a turn and in the absence of monitoring the datum is likely to wander. Banked turns for effecting normal changes of course are of such short duration that any such wander can usually be ignored. However, circumstances may arise, e. g. when the aircraft is under radio control and continuous turns in one sense may occur for long periods, or in which an aircraft is called upon to circle an airfield for some time pending permission to land, under which the wander may be considerable. This means that the actual angle of bank will cease to be the pre-set angle of bank and therefore the pre-set rate of turn will cease to be correct and side slipping will occur.

The object of the present invention is to provide a system in which predetermined rates of turn may be maintained for long periods at substantially the correct angle of bank.

An automatic control system for aircraft, according to the present invention, comprises means for applying a predetermined rate of turn, means for applying a predetermined angle of bank suitably related to the predetermined rate of turn so as to ensure correctly banked turn at a predetermined air speed, and a side-slip detector for varying the angle of bank to reduce the side slip during a turn. It is desirable to ensure that the side slip detector is only operative during small angles of bank.

Figure 1:
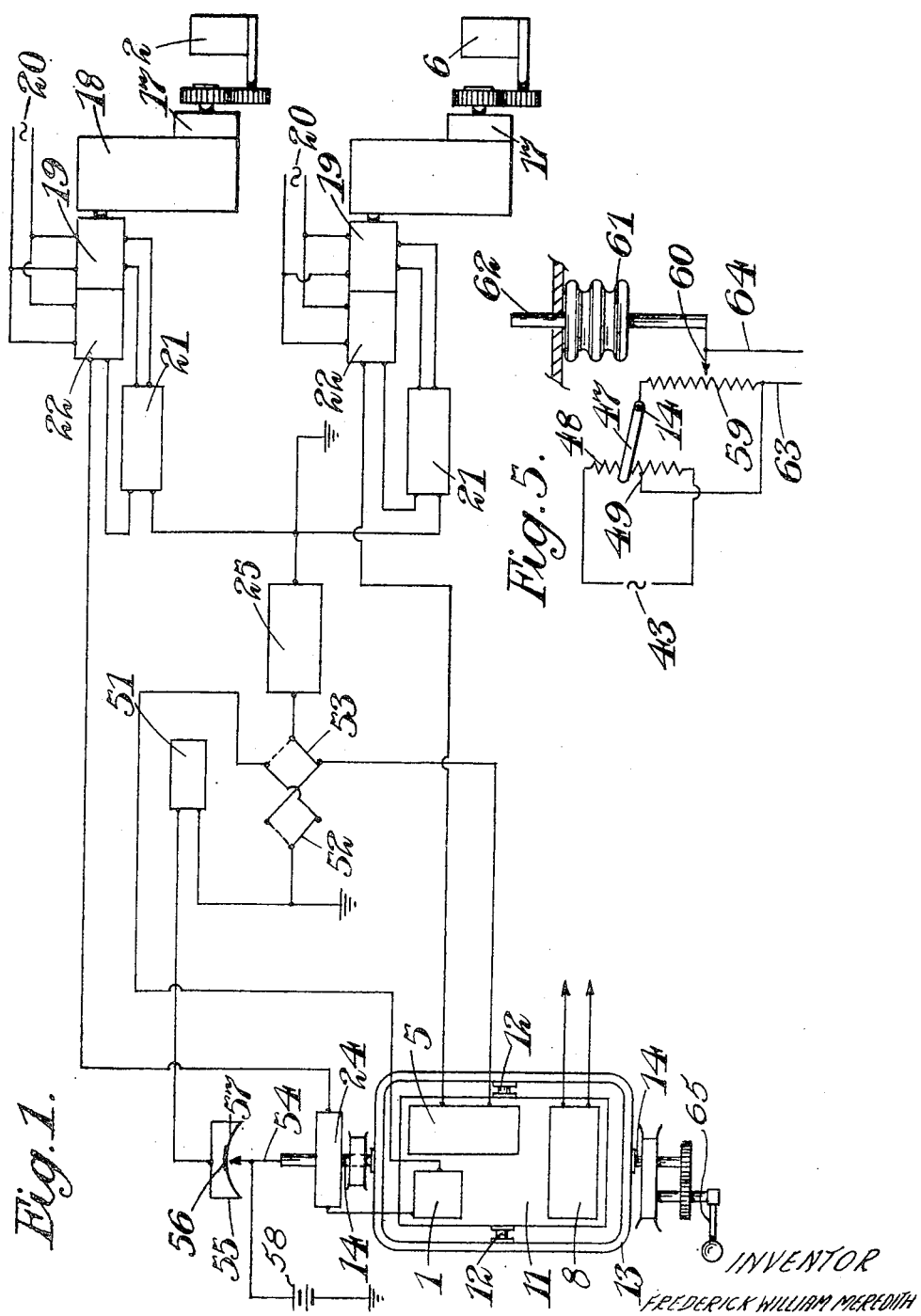
Figure 2:
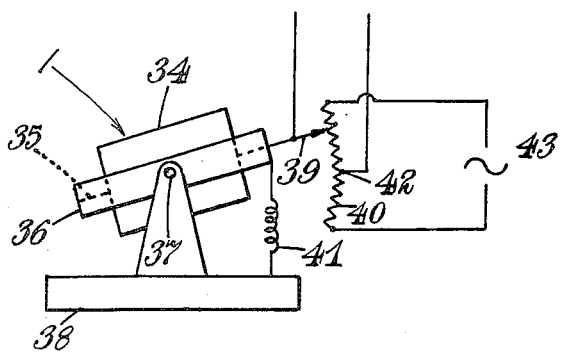
Figure 3:
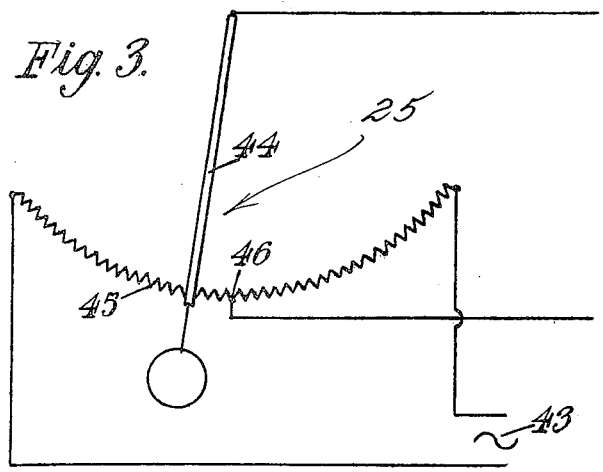
Figure 4:
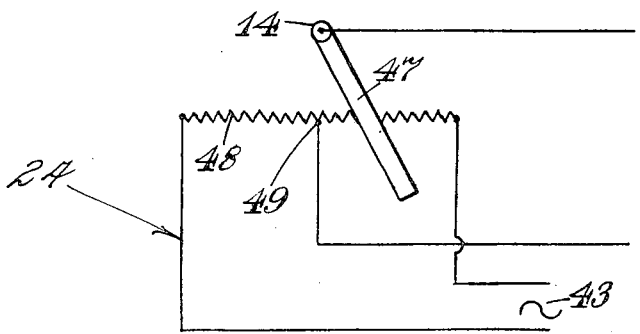

The invention will be more clearly understood from the following description, reference being made to the accompanying drawing in which:

Figure 1 illustrates diagrammatically the layout of an automatic control system for controlling an aircraft during a banked turn, Figure 2 illustrates in further detail the rate of turn instruments shown in Figure 1, Figure 3 illustrates in further detail the side-slip detector shown in Figure 1, Figure 4 illustrates in further detail the tangent potentiometer shown in Figure 1, and Figure 5 illustrates a circuit for correcting the rate of turn of the craft in accordance with the airspeed.

Referring to Figure 1, two rate of turn gyroscopes 1 and 5 measuring rate of turn of the aircraft about the yaw and roll axes respectively are mounted on a platform 11 gimballed about the pitch axis 12 in a gimbal ring 13 pivoted in the aircraft about the roll axis 14. As will be described hereinafter, each gyroscope controls the aircraft about the appropriate axis in accordance with the measured rate of turn.

Each of the control surfaces, rudder 2 and ailerons 6, is coupled through a clutch 17 and gear box 18 to an electric motor 19. Each motor 19 is wound for two-phase operation, one phase (a reference phase) being coupled to an A. C. source 20, and the other phase, the control phase, being coupled to the output of an amplifier 21. Each motor 19 is coupled to a tachometric signal generator 22. Each generator is also wound for two-phase operation, one phase being connected to the source 20 so that an output proportional to the speed of the generator and therefore of the motor is generated in the other phase.

The rate gyroscopes will be described in greater detail hereinafter, and it will suffice for an understanding of Figure 1 to state that a voltage is produced across the output terminals of each rate-of-turn gyroscope which is proportional to the rate of turn and is of the same frequency as that of the source 20 but is in quadrature therewith lagging or leading according as the turn is in one direction or the other.

The tangent potentiometer 24 is positioned on the roll axis 14 of the platform 11 and, as will be described hereinafter, emits an A. C. signal of the same frequency as that of the source 20 but in quadrature therewith. The amplitude of the signal is proportional to the tangent of the angle through which the platform 11 is turned from its level position in the aircraft and the phase of the signal is either lagging or leading on source 20 according as the platform is turned in one direction or the other. This signal is added to the rate-of-yaw signal from the gyroscope 1.

The side-slip detector 25 will be described in more detail below and it will suffice for an understanding of Figure 1 to state that a voltage is produced across its electrical output terminal in accordance with the detected side-slip of the aircraft. This signal is of the same frequency as the source 20 but is in quadrature therewith lagging or leading according as the side-slip is in one sense or the other.

Switches 52, 53 permit the signal from the side-slip detector 25 to be added to either the signal from the yaw gyroscope 1 (dotted lines) or the signal from the roll gyroscope 5 (as shown). The operation of these switches will be described later.

As described in United States patent application Serial Number 658,614 filed by applicant April 1, 1946, and copending herewith, turn of the craft is effected as follows:

When the craft is in level flight, the platform 11 is level in the aircraft. To effect a turn, the platform 11 is rotated about its roll axis 14 by means of the handle 65. A signal proportional to the rate of turning of the platform is then generated by the roll gyroscope 5 and this signal is applied to the input of the high gain roll amplifier 21 through the output terminals of roll generator 22. The input of amplifier 21 has then applied to it two signals—the rate of turn signal and in antiphase therewith the output signal of generator 22 proportional to the rate at which motor 19 runs. The motor 19 is then actuated at a rate proportional to the rate of roll signal from gyroscope 5.

The ailerons 6 are actuated by the rate of roll signal so that the rate of roll of the aircraft is equal and opposite to that of the platform in which case no signal is emitted from the gyroscope 5. If this condition is not satisfied, a signal will be emitted by the gyroscope which will actuate the ailerons 6 until the two rates are equal. The aircraft will then rotate through an angle equal to the rotation of the platform 11 so that the platform will remain level in space. If the aircraft varies from the position in bank determined by the rotation of the platform within the aircraft, the resulting signal from the gyroscope 5 will actuate the ailerons to return it to the predetermined position.

The rudder control circuit comprising rate-of-yaw gyroscope 1, yaw amplifier 21 motor 19 and generator 22 operates in the same manner as does the aileron circuit. In this case however there is the additional component the tangent potentiometer 24. A signal proportional to the tangent of the angle through which the platform is turned from that in which it is level within the aircraft is applied to the yaw amplifier 21 causing the aircraft to turn in yaw at such a rate that the resulting rate-of-turn signal from gyroscope 1 is equal and opposite to the tangent potentiometer signal. If the rate of turn of the aircraft deviates from the value determined by the tangent potentiometer, the rudder will be actuated to change the rate of turn until the determined value is reached.

The constants of the tangent potentiometer are arranged so that when the aircraft is flying at its cruising speed, the rate of turn in yaw is so correlated to the angle of bank of the aircraft that no side slipping occurs.

If the aircraft does not fly at its cruising speed, however, side-slipping occurs. In order to prevent this, the side-slip detector 25 is provided.

In United States patent application Serial Number 658,614, filed by applicant April 1, 1946, and copending herewith, the output from side-slip detector 25 was applied to the rate of yaw circuit, the side-slip signal being added to the yaw gyroscope and tangent potentiometer signals. If side-slipping occurs, the rudder was actuated to alter the rate of turn to such a value in relation to the airspeed and the angle of bank that no side-slipping resulted. With the switches 52, 53 in the positions shown by dotted lines, Figure 1 indicates an arrangement of this type.

Successful operation of this arrangement depends on the platform remaining level since this is the datum from which the angle of bank is measured. During level flight this datum may be maintained by a monitoring signal from a pendulous monitor.

Thus loss of aileron datum may occur during prolonged turns due to the lack of a monitoring signal which would give false signals during the turn. Nevertheless the influence of the side-slip detector 25 will ensure that the turning rate is modified so that the angle of bank of the aeroplane and the rate of turn are still substantially correlated to prevent serious side-slipping. But the loss of datum of the gyro platform has other undesirable effects in that the aeroplane will not return to an accurate cross level when the turn ceases and during the turn the detection axis of the pitch detecting gyroscope 8 for the automatic control of the aircraft in pitch in known manner, being mounted on platform 11, also departs from the horizontal leading to serious disturbance of the pitch attitude varying as the aircraft goes round.

These troubles are more serious for prolonged slow turns than for prolonged fast turns since, in the latter case, any loss of datum is soon transferred to the pitch axis and then to a reversed bank disturbance so that further accumulation of the error is prevented.

In order to obviate these difficulties, the signal from the side-slip detector 25 is applied to the roll control circuit when the angle of bank of the aircraft, set on by rotation of platform 11, is less than some prescribed limit, e. g. 3°, and is applied to the yaw control circuit when the angle of bank is greater than this limit.

This is effected as follows:

On the bank axis 14 of the platform 11 and at right angles thereto is secured a wiper arm 54, travelling over an arcuate contact 55. The central portion 56 of the contact 55, e. g. a portion subtending 6°, is insulating whereas the remainder 57 is conducting. Wiper arm 54 is connected through battery 58 to earth and the conducting portion 57 is connected through relay 51 controlling switches 52, 53 to earth.

The wiper arm 54 is in contact with the centre point of contact 55 when the platform 11 is central in the aircraft. Hence when the bank is greater than 3°, relay 51 is energised and the switches 52, 53 are in the positions shown in dotted lines in Figure 1, thus putting side slip detector 25 in the yaw control circuit and earthing one terminal of roll gyroscope 5. When the angle of bank of the aircraft is less than 3°, wiper arm 54 is in contact with the insulating portion 56 of contact 55, relay 51 is de-energised and switches 52, 53 are in the positions shown in full line in Figure 1. The signal from the side-slip detector 25 is then applied to the roll circuit so that if side-slipping occurs the angle of bank is altered to a value at which side-slipping does not occur, while one terminal of the yaw gyroscope 1 is earthed.

Provided the amount of signal injected from the tangent potentiometer 24 has been correctly set for the speed of flight and provided there is no loss of bank datum the signal from the side-slip detector 25 will be zero. If then there is a loss of bank datum side slip will develop and the injection from the pendulum 25 will monitor the bank datum back to the horizontal i. e., the aeroplane will slowly change its angle of bank till the platform is again level.

If the aeroplane is flying at a different speed, side-slip will occur before there is a loss of bank datum and thus the platform will be caused to depart from the horizontal. Since however the rate of turn and therefore the centrifugal force are small and since the difference between the aeroplane speed and the speed for which the system has been adjusted is generally not large, the resulting error in platform datum is not serious. For larger angles of bank when this loss of datum would be serious the side-slip monitor 25 monitors the rate of turn and the disturbance of the bank datum from this cause is avoided.

When it is desired that the aircraft shall again fly on a level course, the platform 11 is returned to a level position in the aircraft by operation of handle 54. Similarly if it is desired to alter the angle of bank and hence the rate of turning in yaw, the platform is rotated in roll to the desired position, the angle platform 11 makes with the aircraft being the angle of bank of the aircraft.

A suitable rate-of-turn gyroscope for use as gyroscope 1 or 5, is illustrated diagrammatically in Figure 2. As there shown a gyroscope comprises a rotor 34 mounted on spin axis 35 in a gimbal ring 36 gimballed about an axis 37 on a fixed base 38. Carried by the gimbal ring 36 is a potentiometer contact 39 arranged to sweep across a fixed arcuate potentiometer resistance 40 as the ring rotates relatively to the base about the axis 37. The ring 36 is restrained by a spring 41 to a central position in which the contact 39 engages the mid point 42 of the resistance 40. The resistance 40 is connected across the A. C. source 43 which is in quadrature with A. C. source 20. The electrical output of the gyroscope appears between the contact 39 and the mid-point 42.

In operation any turn about an axis normal to the base 38 results in precession of the gyroscope about the axis 37 against the spring restraint to an extent determined by the rate of turn. Hence the output voltage will be proportional to the rate of turn.

A pendulum suitable for use as side-slip detector 25 is illustrated diagrammatically in Figure 3. As there shown a pendulum 44 of suitable conducting material is pivoted to swing about an axis parallel to the roll axis in the case of pendulums 7 and 25 and parallel to the pitch axis in the case of pendulum 10. The pendulum 44 sweeps across an arcuate resistance 45 connected to the A. C. source 43, so that the electrical output appears between the pendulum 44 and the mid point 46 of the resistance 45.

The tangent potentiometer 24 is illustrated diagrammatically in Figure 4. As there shown, an arm 47 of conducting material is attached to the axis 14 so as to rotate with the gimbal ring 13 and sweeps over a linear resistance 48 connected across the A. C. source 43. The output appearing between the arm 47 and the mid point 49 of the resistance is thus proportional to the tangent of the angle through which the gimbal ring 13 is turned.

In an alternative form of the invention, the output from side-slip detector 25 is applied to the roll control system whatever the angle of bank and the rate of turn of the aircraft in yaw is varied in accordance with the airspeed of the craft. This is effected by modifying the system shown in Figure 1 by dispensing with the relay 51, switches 51, 52 and wiper arm 54 and contact 55 and permanently connecting the side-slip detector 25 into the roll control circuit. The tangent potentiometer circuit shown in Figure 4 is modified in the manner shown in Figure 5. Referring to this last figure, 47, 48 and 49 represent the same components as they denote in Figure 4. In this case however arm 47 and mid-point 49 are connected to the ends of a second resistance 59 across which slides an arm 60 actuated by a Sylphon bellows 61 connected to a pitot pressure tube 62, the end of which is outside the aircraft in well known manner. Arm 60 is then moved across resistance 59 in accordance with 1/airspeed. The output from the device is obtained across the leads 63 and 64 which are connected to the yaw rate-of-turn gyroscope 1 and output terminal of yaw generator 22 as in Figure 1. The resistances 49 and 59 are graded so that the output across 63, 64 is proportional to the tangent of the angle of bank and inversely proportional to the airspeed. Variations in the airspeed from the cruising speed of the aircraft are thus automatically accounted for and the rate of turn of the craft in yaw altered to the value necessary for a turn without side-slip.

I claim:

1. An automatic control system for aircraft comprising means for applying to the aircraft a predetermined rate of turn, means for applying to the aircraft a predetermined angle of bank, means for correlating said angle of bank with said rate of turn whereby correct banking of the aircraft for a predetermined air speed is effected, a side-slip detector emitting a signal in accordance with the side-slip of the aircraft, means for controlling the angle of bank of the aircraft by said signal when the angle of bank is less than a predetermined amount and means for controlling the rate of turn by said signal when the angle of bank is greater than the predetermined amount.

2. An automatic control system for aircraft comprising means for controlling the rate of turn of the aircraft, means for controlling the angle of bank of the aircraft, means for applying a predetermined rate of turn, means for applying a predetermined angle of bank, means for correlating said angle of bank with said rate of turn whereby correct banking of the aircraft for a predetermined airspeed is effected, a side-slip detector emitting a signal in accordance with the side-slip of the aircraft, a device responsive to the angle of bank for switching said signal to said control means for said angle of bank when the angle of bank is less than a predetermined amount and to said control means for the rate of turn when the angle of bank is greater than the predetermined amount to reduce the side-slip of the aircraft during a turn.

3. An automatic control system for aircraft as claimed in claim 2 in which the predetermined amount for the angle of bank is of the order of 3°.

4. An automatic control system for aircraft comprising means for applying to the aircraft a predetermined rate of turn, means for applying to the aircraft a predetermined angle of bank, means for correlating said angle of bank with said rate of turn whereby correct banking of the aircraft for a predetermined air speed is effected, means responsive to airspeed for varying the rate of turn to reduce side-slipping due to changes of air-speed from the predetermined value, a side-slip detector to reduce the side-slip during a turn and automatic switch means connected to said detector for selective connection to one of said first two means.

5. In an automatic control system for an aircraft comprising a device carried by the aircraft and defining a roll datum in space and a detector sensitive to deviation from the roll datum to control the ailerons to maintain a datum attitude: the combination of means for applying to the aircraft a selected angle of bank, means for applying to the aircraft a rate of turn in azimuth correlated to the angle of bank to effect correct banking of the aircraft at a predetermined airspeed, a side-slip detector emitting a signal in accordance with the side-slip of the aircraft upon loss of roll datum by said device and means to correct the roll datum in accordance with the side-slip signal, whereby the roll datum defined by said device and the angle of bank are maintained during a turn in azimuth.

6. In an automatic control system for an aircraft comprising a device carried by the aircraft and defining a roll datum in space and a detector sensitive to deviation of the detector from the roll datum to control the ailerons to maintain the detector at datum attitude about the roll axis: the combination of means for rotating the detector through the selected angle relative to the aircraft about the control axis from its position in level flight to apply a selected angle of bank to the aircraft the detector retaining its attitude in space, means for applying to the aircraft a rate of turn in azimuth correlated with the angle of bank to effect correct banking of the aircraft at a predetermined airspeed, a side-slip detector emitting a signal in accordance with the side-slip of the aircraft upon loss of roll datum by said device and means to correct the angle of bank in accordance with the side-slip signal.

7. In an automatic control system for an aircraft comprising a rate of roll device giving an electric signal in accordance with rate of roll of the device from a datum attitude about the roll axis to control the ailerons and a rate of yaw device generating an electric signal in accordance with the rate of turn of the aircraft in yaw to control the rudder: the combination of means to rotate the rate of roll device through a selected angle from its datum position in the aircraft about the roll axis and so to apply to the aircraft a selected angle of bank equal and opposite to the selected angle of rotation, said rate of roll device remaining in a datum attitude in space about the roll axis of the aircraft, means for generating an electric signal equal and opposite to the rate of yaw signal corresponding to the rate of yaw appropriate to the selected angle of bank at a predetermined airspeed, means for controlling the rudder of the aircraft in accordance with the sum of said rate of yaw signal and said further signal to cause the aircraft to make a correctly banked turn at the predetermined airspeed, a side-slip detector emitting an electric signal in accordance with the side-slip of the aircraft upon loss of datum in space of the rate of roll device and means for correcting the angle of bank of the aircraft in accordance with the side-slip signal.

8. The combination as claimed in claim 7 together with a device sensitive to forward airspeed and means operated therefrom to adjust the means for generating a further electric signal in accordance with airspeed to cause the aircraft to make a correctly banked turn for any airspeed.

9. In an automatic control system for an aircraft comprising a device mounted on the aircraft and defining a roll datum in space and a detector sensitive to deviation of the device from the roll datum in space to control the ailerons to maintain a datum attitude; the combination of means for applying to the aircraft a selected angle of bank, means for applying to the aircraft a rate of turn in azimuth correlated to the angle of bank to effect correct banking of the aircraft at a predetermined airspeed, a side-slip detector emitting a signal in accordance with the side-slip of the aircraft and means for correcting the roll datum defined by said device in accordance with that side-slip signal when the angle of bank is less than a predetermined angle, whereby the roll datum defined by said device and the angle of bank are maintained during a turn in azimuth.

10. The combination as claimed in claim 9, wherein the predetermined angle is of the order of 3°.

11. In an automatic control system for an aircraft comprising a device mounted on the aircraft and defining a roll datum in space and a detector giving a signal in accordance with the deviation of the device from the roll datum in space for controlling the ailerons to maintain the device in a datum attitude in space: the combination of a rate of turn gyroscope generating an electric signal in accordance with rate of yaw of the aircraft, means for applying to the aircraft a predetermined angle of bank, means for generating a further electric signal equal and opposite to that generated by the rate of turn gyroscope when the aircraft is flying at a predetermined speed and turning at a rate appropriate to the predetermined angle of bank, means for controlling the rudder of the aircraft in accordance with the sum of the said signal and said further signal to cause the aircraft to execute a correctly banked turn at the predetermined airspeed, a side-slip detector emitting an electric signal in accordance with the side-slip of the aircraft and means for correcting the roll datum defined by said device by the side-slip signal when the angle of bank is less than a predetermined small angle whereby the roll datum defined by said device and the angle of bank are maintained during turns in azimuth made at angles of bank less than the predetermined angle.

12. An automatic control system for aircraft comprising a gyroscope giving a signal in accordance with the rate of yaw of the aircraft, means for controlling the angle of bank of the aircraft, means for applying a predetermined angle of bank, means for generating a further signal equal and opposite to that generated by the gyroscope when the aircraft is turning at a rate appropriate to the predetermined angle of bank at a predetermined air speed, means to control the rudder of the aircraft in accordance with the sum of said rate of turn signal and said further signal to cause the aircraft to execute a correctly banked turn at the predetermined air speed and the predetermined angle of bank, a side-slip detector emitting a signal in accordance with the side-slip of the aircraft, a device responsive to the angle of bank for switching said side-slip signal to said control means for said angle of bank when the angle of bank is less than a predetermined angle and to said rudder control means when the angle of bank is greater than the predetermined angle.

13. An automatic control system for aircraft comprising a platform mounted in the aircraft for rotation about an axis parallel to the roll axis, a gyroscope mounted on said platform and giving an electric signal in accordance with the rate of roll of said platform in space, the signal from said gyroscope controlling the ailerons of the aircraft to maintain the platform in a datum position in space about the roll axis, whereby rotation of the platform about the roll axis through a predetermined angle from its position in the aircraft in straight flight results in rotation of the aircraft in roll through an equal and opposite angle, thus to apply a predetermined angle of bank, a second gyroscope mounted on the platform and giving an electric signal in accordance with the rate of turn of the platform about the vertical, a tangent potentiometer geared to the platform and giving an electric signal in accordance with deviation of the platform from its position in the aircraft in straight flight, said signal being equal and opposite to that produced by the aforesaid second gyroscope when the aircraft is executing a turn at the predetermined angle of bank and a predetermined air speed, means to control the rudder in accordance with the sum of said signals from said second gyroscope and said tangent potentiometer to cause the aircraft to execute a correctly banked turn at the predetermined angle of bank and the predetermined air speed, a pendulum mounted on the aircraft and giving a signal in accordance with side-slip, a changeover relay operated when the angle of bank exceeds a predetermined angle to feed the side-slip signal to the aileron control when the angle of bank is less than the predetermined angle and to the rudder control when the angle of bank exceeds the predetermined angle.

14. A control system according to claim 13 wherein the predetermined angle is of the order of 3°.

15. In an automatic control system for a device to be controlled in a medium, means for producing a rate of turn of said device in the medium, means for producing an angle of bank of the device on the medium, means for correlating the rate of turn, the angle of bank and the relative speed of the device and the medium, a side slip detector for emitting a signal in accordance with the side slip of the device and automatic connection means for selective supply of the emitted signal to said first means when the angle of bank is greater than a predetermined value and to said second means when the angle of bank is less than a predetermined value.

16. In an automatic control system for an aircraft comprising a device mounted on the aircraft and defining a roll datum in space and a detector giving a signal in accordance with deviation of the device from the roll datum in space for controlling the ailerons to maintain the device in a datum attitude in space; the combination of means to rotate the device through a selected angle relative to the aircraft and thereby apply the selected angle of bank to the aircraft, a rate of yaw device generating a first signal in accordance with rate of yaw of the aircraft, means generating a second signal equal and opposite to that generated by the rate of yaw device when the aircraft is flying at a predetermined speed and turning at a rate appropriate to the selected angle of bank, means for controlling the rudder in accordance with the sum of said first and second signals to cause the aircraft to execute a correctly banked turn at the predetermined airspeed, a side-slip detector emitting a third signal in accordance with the side-slip of the aircraft and means for correcting the angle of bank of the aircraft by the said third signal when the angle of bank is less than a predetermined small angle.

17. In an automatic control system for an aircraft comprising a device mounted on the aircraft and defining a roll datum in space and a detector giving a signal in accordance with deviation of the device from the roll datum in space for controlling the ailerons to maintain the device in a datum attitude in space, the combination of a rate of turn gyroscope generating a first signal in accordance with rate of yaw of the aircraft, means for applying to the aircraft a predetermined angle of bank, means for generating a second electric signal equal and opposite to the first signal when the aircraft is flying at a predetermined speed and turning at a rate appropriate to the predetermined angle of bank, means for controlling the rudder of the aircraft in accordance with the sum of the first and second signals to cause the aircraft to execute a correctly banked turn at the predetermined air-speed, a side slip detector emitting a third signal in accordance with the side-slip of the aircraft and means for correcting the angle of bank of the aircraft by the side-slip signal when the angle of bank is less than a predetermined small angle.

FREDERICK WILLIAM MEREDITH.

REFERENCES CITED

The following references are of record in the file of this patent:

UNITED STATES PATENTS

| Number | Name | Date |
|---|---|---|
| 2,162,862 | Protzen | June 20, 1939 |
| 2,371,388 | Glenny | Mar. 13, 1945 |
| 2,415,430 | Frische et al. | Feb. 11, 1947 |
| 2,450,907 | Newton et al. | Oct. 12, 1948 |